United States Patent
Zelenov et al.

(10) Patent No.: US 10,423,774 B1
(45) Date of Patent: Sep. 24, 2019

(54) SYSTEM AND METHOD FOR ESTABLISHING SECURE COMMUNICATION CHANNELS BETWEEN VIRTUAL MACHINES

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Costa Del Sol (SG)

(73) Assignee: PARALLELS INTERNATIONAL GMBH, Schaffhausen (CH)

(*) Notice: Subject to any disclaimer, the term of this patent is extended or adjusted under 35 U.S.C. 154(b) by 233 days.

(21) Appl. No.: 15/682,943

(22) Filed: Aug. 22, 2017

(51) Int. Cl.
  *H04L 29/06* (2006.01)
  *G06F 21/44* (2013.01)
  *H04L 9/32* (2006.01)

(52) U.S. Cl.
  CPC ........ *G06F 21/445* (2013.01); *H04L 63/0442* (2013.01); *H04L 63/126* (2013.01); *H04L 63/168* (2013.01)

(58) Field of Classification Search
  None
  See application file for complete search history.

(56) References Cited

U.S. PATENT DOCUMENTS

| | | | |
|---|---|---|---|
| 8,813,240 B1* | 8/2014 | Northup | G06F 21/554 726/22 |
| 8,938,611 B1* | 1/2015 | Zhu | H04L 49/70 713/153 |
| 9,015,838 B1* | 4/2015 | Northup | H04L 9/005 713/188 |
| 2011/0126269 A1* | 5/2011 | Youngworth | G06F 12/109 726/4 |
| 2013/0326172 A1* | 12/2013 | Tsirkin | G06F 9/45558 711/162 |
| 2016/0110262 A1* | 4/2016 | Nanivadekar | G06F 11/1469 707/654 |
| 2017/0373854 A1* | 12/2017 | Frascadore | H04L 9/0643 |
| 2018/0181764 A1* | 6/2018 | Huntley | G06F 21/602 |
| 2018/0351970 A1* | 12/2018 | Majumder | H04L 63/1408 |
| 2019/0173846 A1* | 6/2019 | Patterson | H04L 63/0272 |

* cited by examiner

*Primary Examiner* — Gary S Gracia
(74) *Attorney, Agent, or Firm* — Arent Fox LLP; Michael Fainberg

(57) ABSTRACT

Disclosed are systems and methods for establishing secure communication between virtual machines, and, more particularly, to a system and method for establishing secure communication channels between two or more homogenous virtual machines. An exemplary method includes generating, by a first virtual machine, an encryption key compatible with a symmetric encryption algorithm and storing the encryption key in a memory of the first virtual machine; generating a second virtual machine by performing a virtual machine forking operation on the first virtual machine, wherein a memory of the generated second virtual machine contains the encryption key; receiving, by one of the at least two virtual machines, a communication transmitted by another of the at least two virtual machines, wherein the communication comprises data encrypted using the encryption key; and decrypting the data, by the recipient virtual machine, using the encryption key.

23 Claims, 5 Drawing Sheets

SYSTEM AND METHOD FOR ESTABLISHING SECURE COMMUNICATION CHANNELS BETWEEN VIRTUAL MACHINES

TECHNICAL FIELD

The present disclosure generally relates to systems and methods for secure communication between virtual machines.

BACKGROUND

In recent years, information security has become increasingly important for businesses and individual consumers. It has long been recognized that data stored on computers, servers and other electronic devices must be protected (e.g., by passwords and other means of access control). However, there has been less interest in the development and adoption of security techniques to protect data in transit. Modern techniques for protecting data in transit between servers and other endpoints using encryption are available, but generally rely on third party certificate centers (e.g., the HTTPS protocol) in order to validate endpoints certificates and to provide notice to other endpoints during the communication process. However, there are many disadvantages associated with these systems.

For example, in the case of HTTPS, a user must trust that the browser software correctly implements HTTPS with correctly pre-installed certificate authorities, and must trust the certificate authority to vouch only for legitimate websites, and that the website provides a valid certificate, which means it was signed by a trusted authority. Moreover, the user must trust that the protocol's encryption layer (SSL/TLS) is sufficiently secure against eavesdroppers. Each of these requirements is a potential point of failure which can result in a complete loss of data security.

Systems which follow this paradigm are relatively easy to implement and provide a reasonable degree of confidence for users. However, systems of this sort suffer from several disadvantages such as the need for additional overhead associated with maintaining a system of certificates for each node in a given network. In addition, there is always the concern that the certificate system will be compromised or that the certificate authority will willingly subvert the system. For example, the certificate authority may be compelled to allow a government agency to eavesdrop on communications due to a court order. Ultimately, systems built on this model can never be fully secured in the sense that there is always some degree of reliance on a third party.

Communication between servers and other devices can also be secured to some extent using encryption protocols that do not rely upon a third party intermediary, such as methods based on symmetric-key algorithms or which implement authentication gateways. However, there are logistical issues associated with developing and implementing systems of this type, such as risks associated with shared keys and the interception of data that can be used to discern encryption keys or capture. Authentication gateways suffer from many of the defects associated with third party certificate authorities in the sense that they may be compromised or disabled (e.g., by a DDoS attack).

The need for secure communication between servers is also particularly important in view of the increasing reliance on virtualized computer systems, particularly at the enterprise level. The virtual machines ("VMs") of numerous customers may be hosted in the same data center sharing the same physical machine resources. One of the challenges in VM deployments is to establish customer trust that data stored on and transmitted to, from, or between multiple VMs that belong to the customer are protected from eavesdropping and that the VMs are not accidentally opened up to other users or other customers. Secure transmission of data between virtual machines is therefore a significant issue, which will likely become increasingly important going forward based on current trends which project increased adoption of virtualization by consumers and enterprise users alike.

In view of these shortcomings, there exists a need for additional means of establishing secure communication channels between computers and other electronic devices, regardless of whether such endpoints are physical or virtual in nature.

SUMMARY

Accordingly, a system and method is disclosed for establishing a secure communication channel between virtual machines. In an exemplary aspect, the method comprises generating, by a first virtual machine, an encryption key compatible with a symmetric encryption algorithm and storing the encryption key in a memory of the first virtual machine; generating a second virtual machine by performing a virtual machine forking operation on the first virtual machine, as described in detail below, wherein a memory of the generated second virtual machine contains the encryption key; receiving, by either one of the two virtual machines, a communication transmitted by the other respective virtual machine, wherein the communication comprises data encrypted using the encryption key; and decrypting the data, by the recipient virtual machine, using the encryption key. In some exemplary aspects, a method is provided for establishing one or more secure channels between at least two homogeneous virtual machines.

According to another exemplary aspect, the encryption key is a random string. In some exemplary aspects, the random string is generated by an algorithm configured to generate strong cryptographically-secure strings (e.g., high or maximum entropy without any pattern). In some exemplary aspects, the random string is alphanumeric. However, the character set used for the random string may comprise any character set preferred for a given implementation.

According to another exemplary aspect, the second virtual machine is a linked clone of the first virtual machine. In an alternative exemplary aspect, the second virtual machine is a full clone of the first virtual machine.

According to another exemplary aspect, the virtual machine forking operation comprises: generating, by the first virtual machine, a unique identifier associated with the first virtual machine; communicating, by the first virtual machine, a request to a virtual machine manager to generate the second virtual machine by cloning the first virtual machine; assigning, by the virtual machine manager parent or clone status to the at least two virtual machines; and determining, by one of the at least two virtual machines, whether it is a parent or a clone.

According to another exemplary aspect, the request to the virtual machine manager further includes the unique identifier associated with the first virtual machine.

According to another exemplary aspect, the virtual machine manager is configured to record the internet protocol (IP) address of the first virtual machine when it receives the request to generate the second virtual machine, and to assign parent status to the virtual machine that has the same IP address as the recorded IP address.

According to another exemplary aspect, the method further comprises pausing the first virtual machine prior to the cloning operation; and unpausing both virtual machines after the cloning operation is complete.

According to another exemplary aspect, the virtual machine manager and the first virtual machine are configured to communicate over a network.

According to another exemplary aspect, the first virtual machine is configured to communicate with the virtual machine manager using at least one of the following: a) a virtual COM port using a pipe with a predefined name based on the unique identifier; b) a virtual USB device; or c) an API configured to allow communication between the virtual machine and the virtual machine manager. In other exemplary aspects, any communication protocol, channel or system suitable for a given implementation may be used.

According to another exemplary aspect, the virtual machine manager is a hypervisor.

In one further exemplary aspect, a system is disclosed for establishing a secure communication channel between at least two virtual machines. In this aspect, the system includes a processor configured to generate, by a first virtual machine, an encryption key compatible with a symmetric encryption algorithm and storing the encryption key in a memory of the first virtual machine; generate a second virtual machine by performing a virtual machine forking operation on the first virtual machine, wherein a memory of the generated second virtual machine contains the encryption key; receive, by one of the two virtual machines, a communication transmitted by the other respective virtual machine, wherein the communication comprises data encrypted using the encryption key; and decrypt the data, by the recipient virtual machine, using the encryption key.

According to another exemplary aspect, a system is provided where the processor is configured to perform any of the methods disclosed herein.

In one further exemplary aspect, a non-transitory computer readable medium is provided that comprises computer executable instructions for generating, by a first virtual machine, an encryption key compatible with a symmetric encryption algorithm and storing the encryption key in a memory of the first virtual machine; generating a second virtual machine by performing a virtual machine forking operation on the first virtual machine, wherein a memory of the generated second virtual machine contains the encryption key; receiving, by one of the virtual machines, a communication transmitted by the other respective virtual machine, wherein the communication comprises data encrypted using the encryption key; and decrypting the data, by the recipient virtual machine, using the encryption key.

According to another exemplary aspect, a computer-readable medium is provided comprising instructions that comprises computer executable instructions for performing any of the methods disclosed herein.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
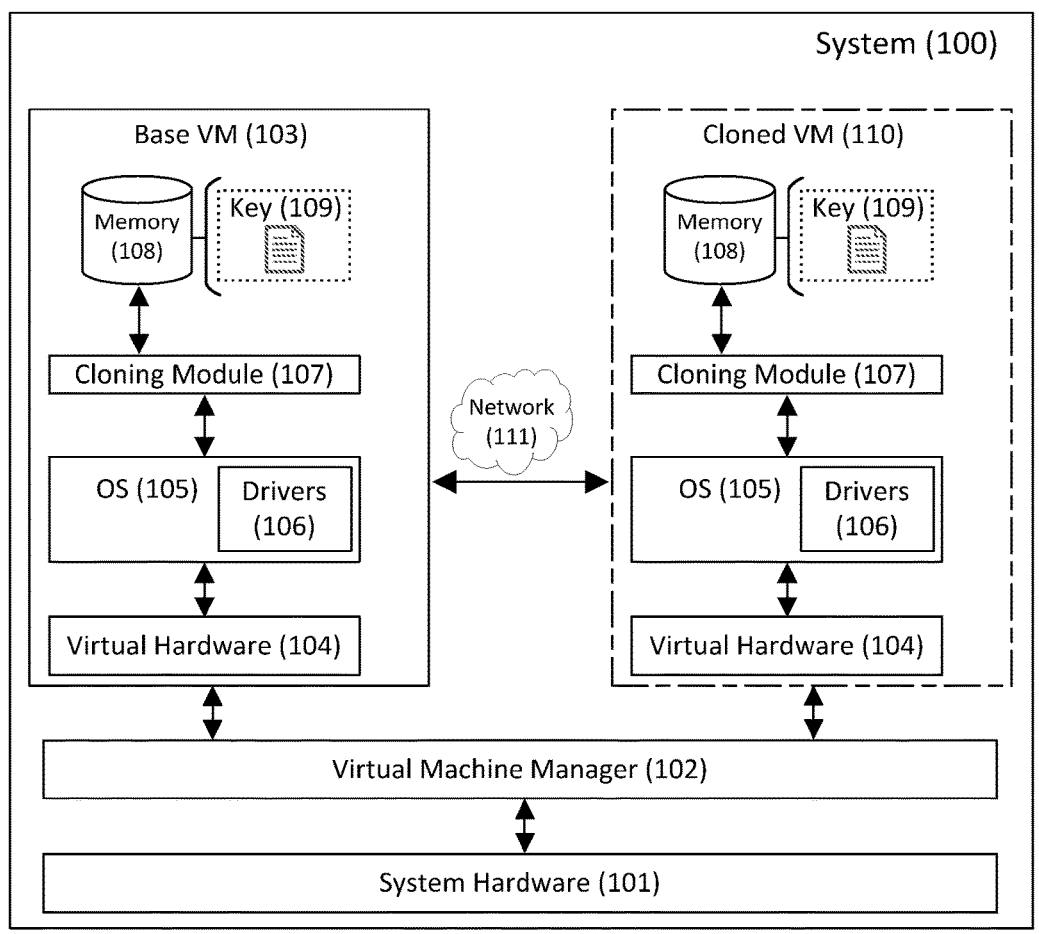
FIG. 1 illustrates a block diagram of a system for establishing a secure communication channel between at least two virtual machines according to an exemplary embodiment.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 1 illustrates a block diagram of a system for establishing a secure communication channel between at least two virtual machines according to an exemplary embodiment. As shown, the system 100 generally includes system hardware (101) such as a desktop or server computer or any other electronic device sufficient for implementing virtualization as described herein. On the system hardware (101), a virtual machine manager (102) may execute in order to control and manage virtualization on the system hardware (101). The virtual machine manager (102) may run on directly on the underlying system hardware (101) or as an application or component running within an operating system installed on the system hardware (101). For example, the virtual machine manager (102) may be a hypervisor.

The virtual machine manager (102) may in turn execute one or more instances of a virtual machine ("VM") on the system hardware (101). In this exemplary aspect, a base VM (103) and a cloned VM (110) are shown. Each VM in this exemplary aspect comprises virtual hardware (104), a guest OS (105) including one or more drivers (106), memory allocated to the VM by the virtual machine manager (102). A cloning module (107) may also be installed and/or executed by the one or more VMs, the cloning module (107) being an application, process or component of the VM capable of performing, initiating or otherwise assisting with the implementation of one or more of the functions required for cloning the base VM (103), as described in greater detail below. In alternative exemplary aspects, the cloning module (107) may be a component of the guest OS (105). In other exemplary aspects, a cloning module (107) may be omitted and functions performed by the cloning module (107) may instead be performed by the virtual machine manager (102).

In this figure, a single cloned VM (110) is illustrated. However, in some aspects a plurality of clone VMs (110) instances may be executed or otherwise managed by the virtual machine manager (102). Cloned VMs may be linked or unlinked clones of a base VM (103). An unlinked clone is an independent copy of a VM that shares nothing with the base VM after the cloning operation. In other words, ongoing operation of a cloned VM after cloning is fully independent from the parent base VM. In contrast, a linked clone is a copy of a VM that shares virtual disks with the base VM in an ongoing manner and requires access to the base VM in order to function.

As illustrated by this figure, a memory (108) allocated to the base VM (103) and cloned VM (109) may each contain a key (109) suitable to allow for secure communication between the base BM (103) and the one or more cloned VMs (110). For example, in some exemplary aspects the key (109) is an encryption key compatible with a symmetric encryption algorithm. In some exemplary aspects, the key (109) is a random string. As will be described in more detail below, the key (109) will typically be generated prior to the cloning operation used to produce the cloned VM (110).

The cloning operation described herein may comprise the creation of a full or linked clone of the base VM (103). In some exemplary aspects, the cloning operation may generate a cloned VM (110) that omits aspects of the base VM (103) (e.g., it may be only a partial clone that omits particular applications, files or other components stored in the base VM (103)). In some exemplary aspects, as described in detail in the methods below, the cloning operation may include the cloning of a memory (108) of the base VM (103) that includes a key (109). The key (109) may be an encryption key (e.g., compatible with a symmetric encryption algorithm). In these exemplary aspects, after the cloning operation has completed, the base VM (103) and cloned VM (110) each possess the key (109), providing a means for encrypting/decrypting communication between the base VM (103) and cloned VM (110) after a communication channel has been established.

As illustrated by this figure, the base VM (103) and the one or more cloned VMs (110) may be configured to communicate, directly or indirectly, using one or more communication channels as represented by the network (111). For example, each of the VMs may include one or more virtual interfaces capable of transmitting and receiving packets (e.g., a bridged Ethernet configuration). In some exemplary aspects, the network may be configured as a host-only network that only allows communication between a host OS running on the system hardware (101) and the one or more VM instances executed by the virtual machine manager (102). Alternatively, open configurations may be implemented to allow the one or more VM instances to communicate with external networks or computing devices in addition to the host OS running or virtual machine manager (102) running on the system hardware (101). The networking interface may be configured to utilize any network communication protocol (e.g., Internet Protocol (IP)). In some exemplary aspects, the communication protocol is one that is compatible with end-to-end encryption.

Communication between the one or more VM instances executed by the virtual machine manager (102) may implement a secure communication protocol (e.g., compatible with the selected network protocol used for communication). In some exemplary aspects, the secure communication protocol may be a protocol configured to provide end-to-end encryption, such as the Signal Protocol, which was formerly known as the TextSecure Protocol, developed by Open Whisper Systems. The secure communication channel may be used to authenticate VM instances (e.g., by providing an outside channel that can be used to compare fingerprints associated with the respective VM instances), allowing for the detection of man-in-the-middle attacks. For example, a base VM (103) may generate two unique identifiers (using methods and/or parameters as described elsewhere herein for encryption keys) and store the pair of unique identifiers in memory. The base VM (103) may then be cloned to produce a cloned VM (110) which will contain the pair of unique identifiers in memory. The cloning process allows both VM instances to receive each other's respective unique identifier without the need to transfer the unique identifier through a potentially insecure communication channel that could be monitored by a third party. At this stage, the two VM instances may then set up a secure communication channel using the Signal Protocol (by exchanging public keys, etc.). Each VM instance may verify that a man-in-the-middle attack has not occurred by comparing fingerprints generated based on their public key and respective unique identifier as a salt. A potential man-in-the-middle attacker seeking to decrypt or forge secure communications generated according to this method will not have access to the unique identifiers and so cannot generate a proper fingerprint. Thus, such methods provide a secure communication channel resistant to man-in-the-middle attacks.

In some exemplary aspects the virtual machine manager (102) may announce its presence over a network connection shared with the base VM (103). Software executed on the base VM (103) such as the cloning module (107) may be configured to recognize this announcement and store the IP address of the virtual machine manager (102) in a memory (108) allocated to the guest OS of the base VM (103). When the base VM (103) needs to initiate a cloning operation, it can transmit a unique identifier to the virtual machine manager (102) using the stored address, and wait for a response (e.g., by polling the virtual machine manager (102)). The virtual machine manager, in turn, can store the unique identifier of the base VM (103) in a memory.

The virtual machine manager (102), in some exemplary aspects, may also store the IP address of the base VM (103) that has requested initiation of a cloning operation. The virtual machine manager (102) may use the stored unique identifier and corresponding IP address of the requester to identify the base VM (103) after the cloning operation has been completed. For example, the virtual machine manager (102) may trigger a cloning operation to generate a cloned VM (110) that is a linked clone of the base VM (103) in response to a request from the base VM (103). After execution of the cloning operation, the base VM (103) and the new cloned VM (110) may request and/or receive identification from the virtual machine manager (102) indicating whether it is the parent (e.g., the base VM (103)) or a linked clone of the base VM (103) (e.g., a cloned VM (110)).

As indicated above, the virtual machine manager (102) may make this determination by cross-referencing the unique identifier and/or IP address of the VM that requested the cloning operation in order to identify the base VM (103). By implication, a VM that has a different IP address postcloning will be a cloned VM (110), such as the linked clone VM in this particular example. In some exemplary aspects, alternative communication means may be implemented to allow for inter-VM or VM-to-virtual machine manager (102) communication. For example, virtual COM ports may be implemented to allow communication with the virtual machine manager (102). The VM can set a COM port emulation to pipe with a predefined name based on a unique ID of the VM. The virtual machine manager (102) may obtain a list of running VMs and listen to the pipes, providing a communication channel between a VM and the virtual machine manager (102).

In other exemplary aspects, the VM may implement a virtual USB device to communicate with a host OS running on the system hardware (101). For example, a virtual USB may be established by registering a custom USB vendor and device ID and implementing a virtual USB bus using a driver developed for the virtual USB. The custom USB can then be connected to the virtual bus in the host OS and assigned as a pass-through USB device to a specific VM instance running on the system hardware (101), allowing the VM to communicate with the host OS and/or to the virtual machine manager (102).

In still further exemplary aspects, the VMs may communicate with each other or to the virtual machine manager (102) using an application programming interface (API). The API may, for example, be provided by the vendor of a particular virtual machine manager (102). It is understood that any communication protocol or system known in the art may be used to establish a communication channel between the VM instances and the virtual machine manager (102), or between the individual VM instances, directly or indirectly.

In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 2:
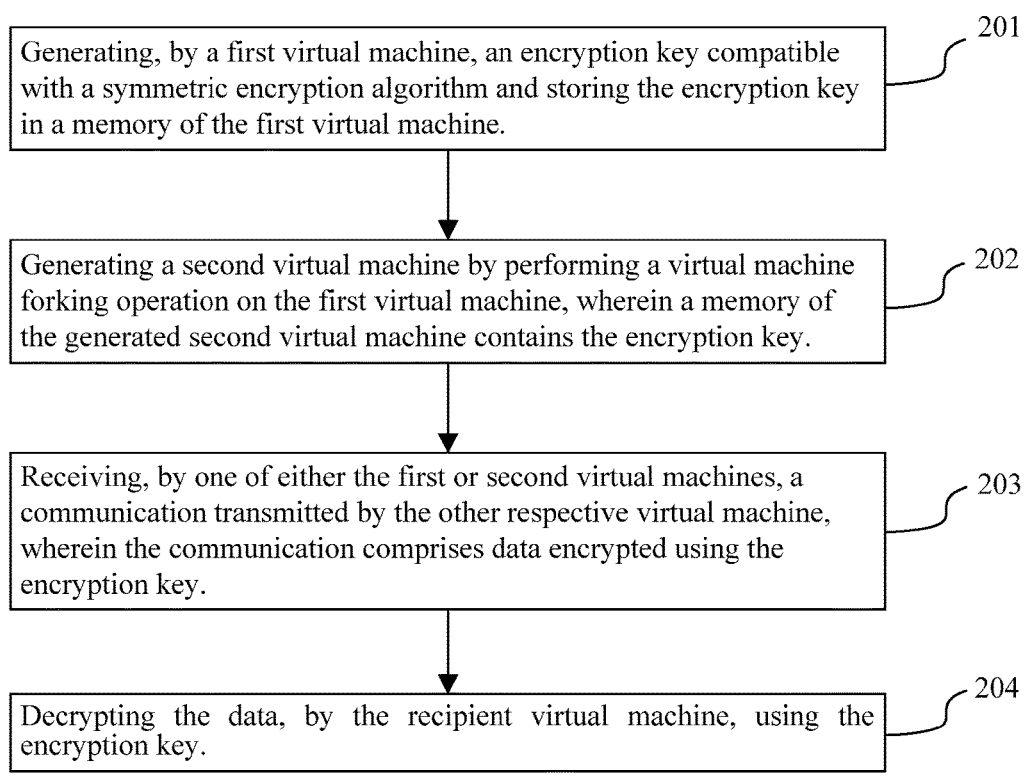
FIG. 2 illustrates a flowchart for a method for establishing a secure communication channel between at least two virtual machines according to an exemplary embodiment.

FIG. 2 illustrates a flowchart of a method for establishing a secure communication channel between at least two virtual machines according to an exemplary embodiment. It should be appreciated that the following description of this exemplary method makes reference to the system and components described above with respect to FIG. 1. The same is true for the description of FIGS. 3 and 4 below.

As shown by this exemplary aspect, the method may begin by generating, by a first virtual machine, an encryption key compatible with a symmetric encryption algorithm and storing the encryption key in a memory of the first virtual machine (201). Next, a second virtual machine may be generated by performing a virtual machine forking operation on the first virtual machine, wherein a memory of the generated second virtual machine contains the encryption key (202). Third, one of the at least two virtual machines may receive a communication transmitted by another of the at least two virtual machines, wherein the communication comprises data encrypted using the encryption key (203). Finally, the data may be decrypted by the recipient virtual machine, using the encryption key (204).

In some exemplary aspects, the virtual machine forking operation may comprise the generation of a plurality of cloned VMs (110). Each of the cloned VMs (110) may be a full clone or linked clone of the base VM (103). In some exemplary aspects, at least one cloned VM (110) may be a homogeneous clone of the base VM (103) sharing the same OS as the base VM (103). In other exemplary aspects, the cloned VM (110) may have a modified or different OS (e.g., the virtual machine forking operation may include a step of upgrading or modifying components of the OS of the base VM (103)). In some exemplary aspects, virtual machine forking operation may include a step of pausing the base VM (103) during the virtual machine forking operation and/or unpausing the base VM (103) after the virtual machine forking operation has completed.

In some exemplary aspects the encryption key is a key that is compatible with a symmetric encryption algorithm such as, but not limited to, the Blowfish, DES, IDEA, MARS, RC2, RC4, RC5, RC6, AES, Serpent, Triple-DES, or Twofish algorithms. In other exemplary aspects, any symmetric encryption algorithm may be used if preferred for a given implementation. The symmetric encryption algorithm may be a block or stream-type algorithm. Block algorithms encrypt data a block (many bytes) at a time, while stream algorithms encrypt data at the level of individual bytes (or bits). In some exemplary aspects, the method may comprise a step of determining an appropriate level of encryption for the secure communication channel to be established between the base VM (103) and the cloned VM (110) prior to generating the encryption key. For example, an encryption key may comprise a random string of a given length, with the length varying based upon the desired level of encryption (e.g., 256-bit). In some exemplary aspects, multiple encryption keys may be generated. In some exemplary aspects, the first two steps may be repeated, e.g., a second VM generated by the virtual machine cloning process contained a first encryption key in memory and a third VM is generated containing a first and a second encryption key in memory. By repeating this process, a plurality of VMs may be generated, each having a different set of encryption keys in memory, wherein the first VM (i.e., the base VM (103) retains a full set of the encryption keys. Thus, the second VM may be a cloned VM (110) with a 256-bit encryption key stored in memory while a third VM generated during the virtual machine forking operation may have a 512-bit encryption key stored in memory. Both VMs would be capable of establishing a secure communication channel with the base VM (103) using their respective encryption keys because the base VM (103) retains a set of all of the encryption keys.

Figure 3:
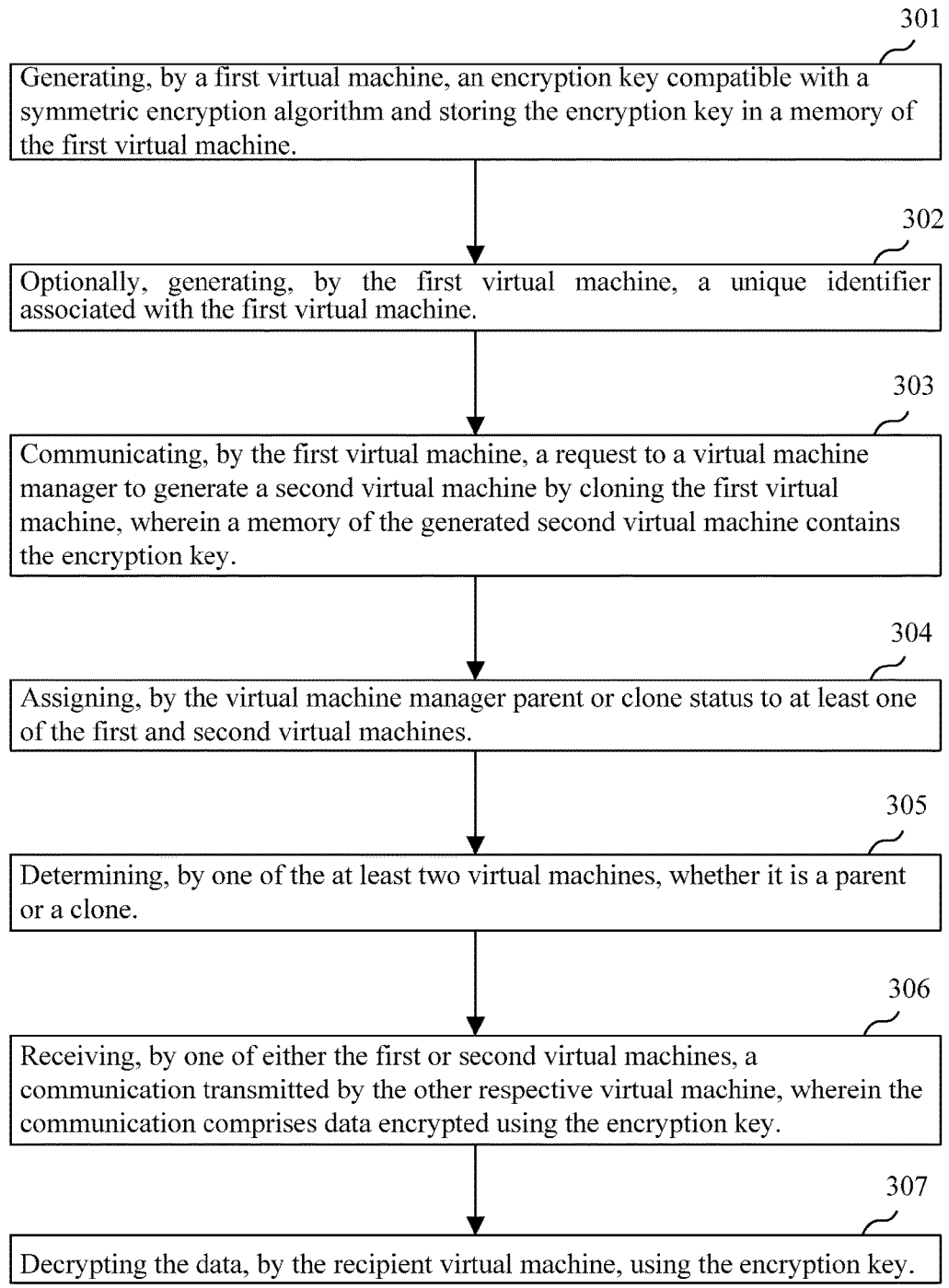
FIG. 3 illustrates a flowchart for a method for establishing a secure communication channel between at least two virtual machines according to an exemplary embodiment.

FIG. 3 illustrates a flowchart of a method for establishing a secure communication channel between at least two virtual machines according to another exemplary embodiment. In this exemplary aspect, the process is initiated by generating, by a first VM, an encryption key compatible with a symmetric encryption algorithm and storing the encryption key in a memory of the first VM (301). The first VM (e.g., a base VM (103)) may then, optionally, generate a unique identifier associated with the first VM (302). In some exemplary aspects, the unique identifier is preexisting (e.g., pre-generated or a pre-existing property of the VM). Next, the first VM may communicate a request to a virtual machine manager (102) to generate a second VM (e.g., a cloned VM (110)) by cloning the first VM, wherein a memory of the generated second VM contains the encryption key (303). Next, the virtual machine manager (102) may assign parent or clone status to the two VMs (304). For example, the virtual machine manager (102) may assign parent status (e.g., identify the base VM (103)) based upon the unique identifier and/or a stored IP address associated with the VM that requested the generation of a second VM in step (303). The virtual machine manager (102) may assign clone status (e.g., identify the cloned VM (110) based upon the unique identifier and/or a stored IP address associated with the VM that requested the generation of a second VM, wherein a discrepancy in the IP address of the generated VM confirms that the VM is a cloned VM (110). Next, at least one of the at least two VMs resulting from the cloning operation may determine whether it is a parent or a clone (305). This determination may be made by requesting assignment of parent/clone status from the virtual machine manager (102) or receiving an assignment without a preceding request. Next, one of the at least two VMs may receive a communication containing encrypted data transmitted by another of the at least two VMs (306). This transmission may be from the base VM (103) to one of the at least one cloned VMs (110) generated during a method according to this exemplary aspect, or from one of the at least one cloned VMs (110) to the base VM (103). Finally, the recipient VM (in either of the two aforementioned configurations) may decrypt the encrypted data using the encryption key (307).

Figure 4:
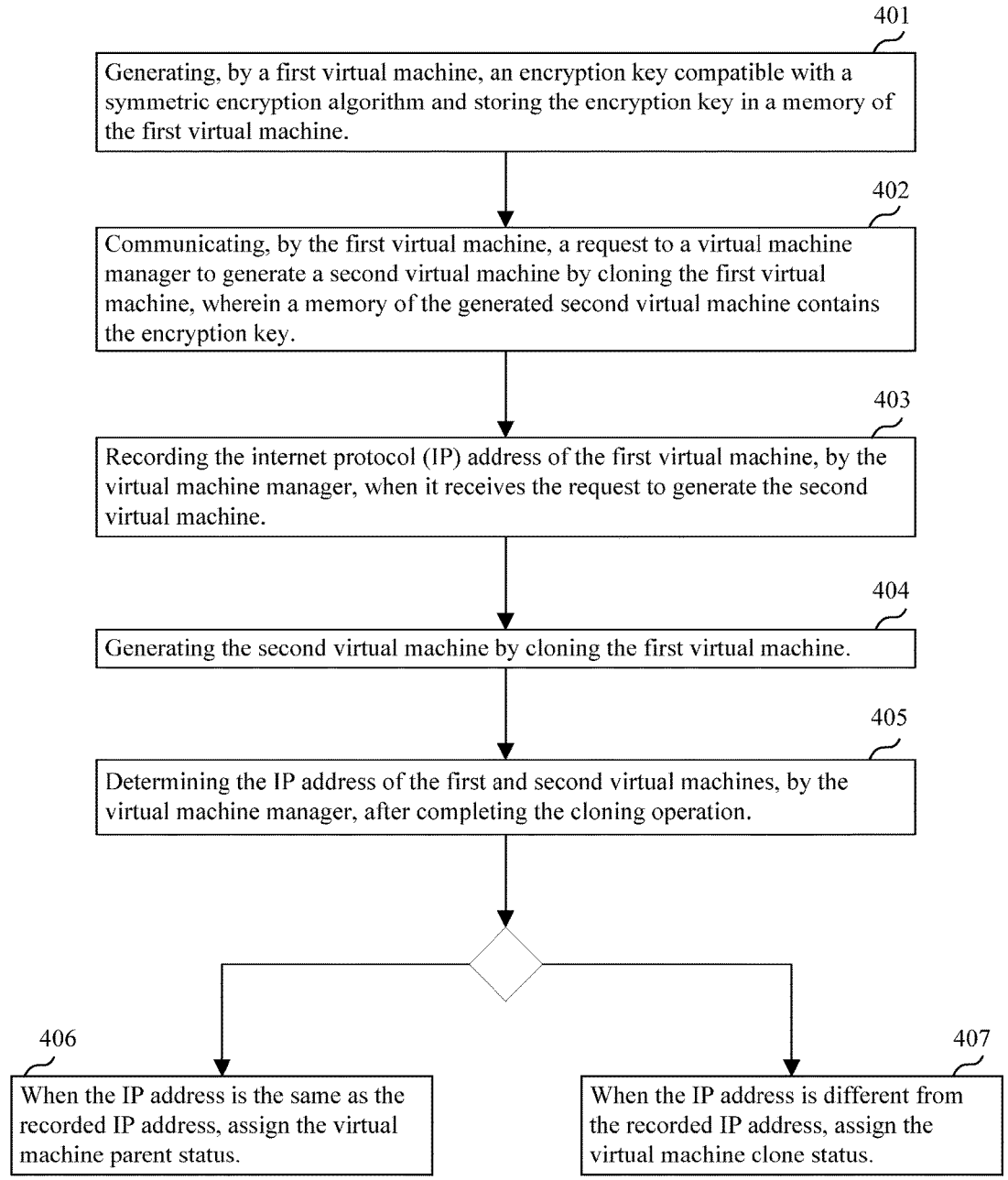
FIG. 4 illustrates a flowchart for a method for establishing a secure communication channel between at least two virtual machines according to an exemplary embodiment.

FIG. 4 illustrates a flowchart of a method for establishing a secure communication channel between at least two VMs according to another exemplary embodiment.

As shown, initially, at step (401) a first VM (e.g., a base VM (103)) may generate an encryption key compatible with a symmetric encryption algorithm and store the encryption algorithm in a memory of the first virtual machine. Next, at step (402) the first VM may communicate a request to a virtual machine manager (102) to generate a second VM by cloning the first VM (e.g., a cloned VM (110)), wherein a memory of the second VM contains the encryption key. At step (403), the virtual machine manager (102) may store the IP address of the first VM than submitted the request at step (402). The second VM may then be generated by the virtual machine manager (102) using the virtual machine forking process or any other VM cloning method described herein (404). After the second VM is generated, the virtual machine manager (102) may determine the IP address of the first and second VMs resulting from the cloning operation (405). This determination may be made by the virtual machine manager (102) directly or in response to a request for a determination of parent/clone status from at least one of the two VMs resulting from the cloning operation. At this stage, the virtual machine manager (102) may determine that the VM has the same IP address as the VM that requested the cloning operation and assign this VM parent status (e.g., identifying the base VM (103)) (406). Alternatively, the virtual machine manager (102) may determine that the IP address of the VM does not match the IP address associated with the requester and so may assign clone status to the VM (e.g., identifying a cloned VM (110)).

It is understood that the parameters and configurations used in any of the methods described as exemplary aspects above may incorporate modifications based on any other exemplary aspect described herein. For example, as noted above the cloned VM (110) may be a linked or full clone and various networking options are contemplated as potential communication channels for VM-to-VM communication.

The interchangeability of various parameters and configurations described herein should be readily apparent in light of the totality of the disclosure. Furthermore, it is understood that some or all of the steps performed by the VMs described above may be performed and/or managed by the cloning module (107) (e.g., the cloning module (107) may direct communication with the virtual machine manager (102), and/or generate the key (109)). However, in some exemplary aspects, some or all functions may instead be performed by other applications or OS components executed by the VM. Alternative configurations may be preferable for a given use case, as will be appreciated by the reader.

Figure 5:
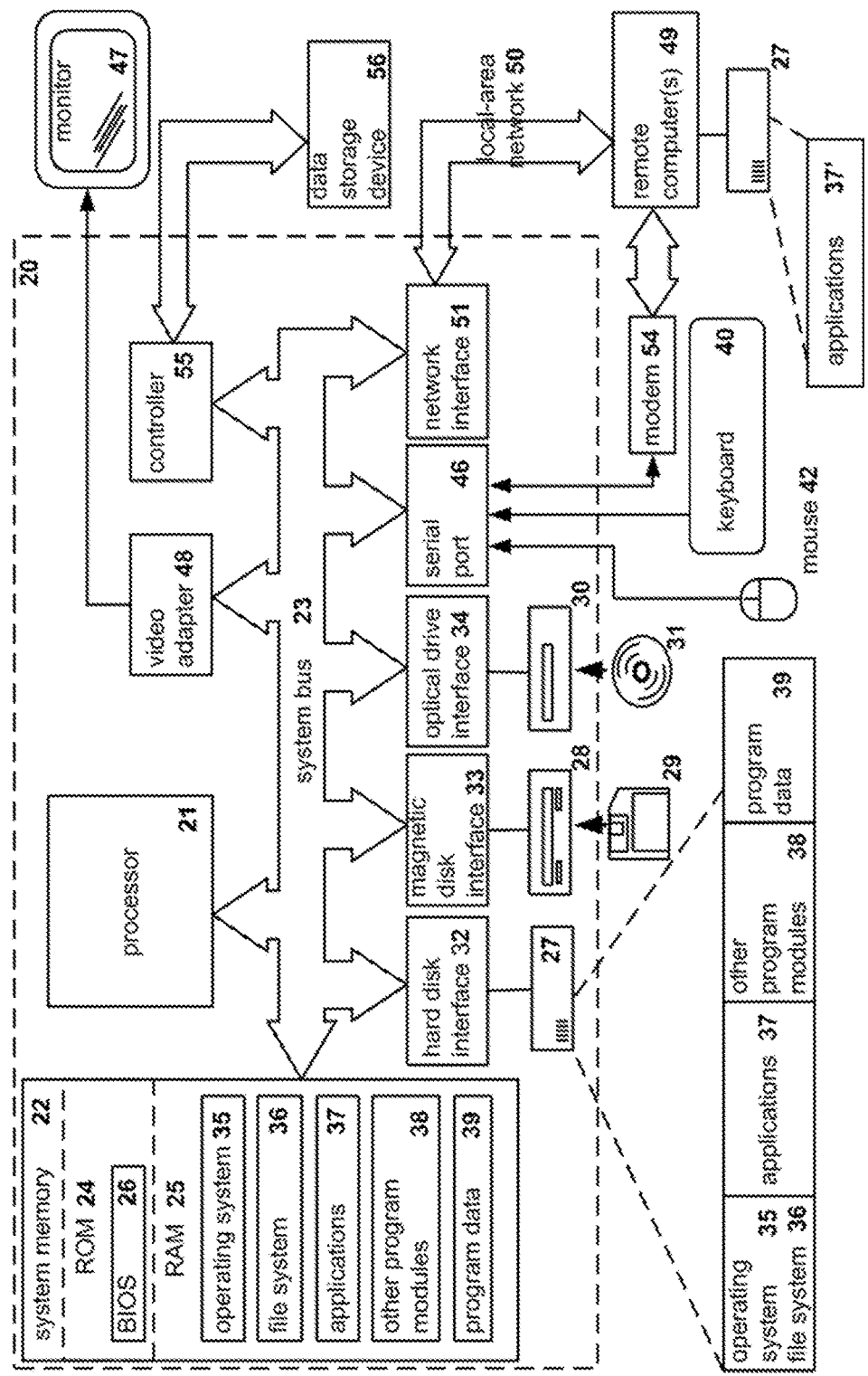
FIG. 5 illustrates a block diagram of an example of a general-purpose computer system on which the disclosed systems and methods can be implemented according to an exemplary aspect.

FIG. 5 illustrates a block diagram of an example of a general-purpose computer system on which the disclosed system and method can be implemented according to an example aspect. More particularly, a general purpose computing device is provided in the form of a computer system 20 that illustrates exemplary components that can be provided for a computing device, such as mobile device 110. As shown, the computer system 20 can include a processing unit 21, a system memory 22, and a system bus 23 that couples various system components including the system memory to the processing unit 21. It should be appreciated that processing unit 21 can correspond to CPU 210, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like, provided for receiving speech based commands, for example.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, such as computing device 120, a server, a router, a network PC, a peer device or other common network node, and typically includes many or all of the elements described above relative to the computer 20. The logical connections include a network interface 51 and a wide area network (WAN). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. One or more of the above-noted components can correspond to I/O interface 220 according to an exemplary aspect.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for establishing a secure communication channel between at least two virtual machines, comprising:
    generating, by a first virtual machine, an encryption key compatible with a symmetric encryption algorithm and storing the encryption key in a memory of the first virtual machine;
    generating a second virtual machine by performing a virtual machine forking operation on the first virtual machine, wherein a memory of the generated second virtual machine contains the encryption key, and wherein the virtual machine forking operation comprises:
    generating, by the first virtual machine, a unique identifier associated with the first virtual machine;
    communicating, by the first virtual machine, a request to a virtual machine manager to generate the second virtual machine by cloning the first virtual machine; and
    assigning, by the virtual machine manager, parent or clone status to the at least two virtual machines;
    receiving, by one of the at least two virtual machines, a communication transmitted by another of the at least two virtual machines, wherein the communication comprises data encrypted using the encryption key; and
    decrypting the data, by the recipient virtual machine, using the encryption key.

2. The method of claim 1, wherein the encryption key is a random string.

3. The method of claim 1, wherein the second virtual machine is a linked clone or a full clone of the first virtual machine.

4. The method of claim 3, wherein the request to the virtual machine manager further includes the unique identifier associated with the first virtual machine.

5. The method of claim 3, wherein the virtual machine manager is configured to record the internet protocol (IP) address of the first virtual machine when it receives the request to generate the second virtual machine, and to assign parent status to the virtual machine that has the same IP address as the recorded IP address.

6. The method of claim 3, further comprising:
    pausing the first virtual machine prior to the cloning operation; and
    unpausing both virtual machines after the cloning operation is complete.

7. The method of claim 3, wherein the virtual machine manager and the first virtual machine are configured to communicate over a network.

8. The method of claim 3, wherein the first virtual machine is configured to communicate with the virtual machine manager using at least one of the following:

a) a virtual COM port using a pipe with a predefined name based on the unique identifier;
b) a virtual USB device; or
c) an API configured to allow communication between the virtual machine and the virtual machine manager.

9. The method of claim 1, wherein the virtual machine forking operation further comprises:
manager to generate the second virtual machine by cloning the first virtual machine;
determining, by one of the at least two virtual machines, whether it is a parent or a clone.

10. The method of claim 1, wherein the virtual machine manager is a hypervisor.

11. The method of claim 1, further comprising:
generating, by the first virtual machine, one or more additional encryption keys prior to the virtual forking operation; and
decrypting the data, by the recipient virtual machine, requires at least one of the additional encryption keys.

12. A system for establishing a secure communication channel between at least two virtual machines, comprising:
a first virtual machine having a hardware processor configured to:
generate an encryption key compatible with a symmetric encryption algorithm and store the encryption key in a memory of the first virtual machine;
a virtual machine manager configured to:
generate a second virtual machine by performing a virtual machine forking operation on the first virtual machine, wherein a memory of the generated second virtual machine contains the encryption key, and wherein the virtual machine forking operation comprises:
generating, by the first virtual machine, a unique identifier associated with the first virtual machine;
communicating, by the first virtual machine, a request to the virtual machine manager to generate the second virtual machine by cloning the first virtual machine; and
assigning, by the virtual machine manager, parent or clone status to the at least two virtual machines;
wherein the hardware processor of the first or second virtual machine is configured to:
receive a communication transmitted by another of the at least two virtual machines, wherein the communication comprises data encrypted using the encryption key; and
decrypt the data, by the recipient virtual machine, using the encryption key.

13. The system of claim 12, wherein the encryption key is a random string.

14. The system of claim 12, wherein the second virtual machine is a linked clone or a full clone of the first virtual machine.

15. The system of claim 12, wherein the virtual machine forking operation further comprises:
determining, by one of the at least two virtual machines, whether it is a parent or a clone.

16. The system of claim 15, wherein the request to the virtual machine manager further includes the unique identifier associated with the first virtual machine.

17. The system of claim 12, wherein the virtual machine manager is configured to record the internet protocol (IP) address of the first virtual machine when it receives the request to generate the second virtual machine, and to assign parent status to the virtual machine that has the same IP address as the recorded IP address.

18. The system of claim 12, wherein the virtual machine manager is further configured to:
pause the first virtual machine prior to the cloning operation; and
unpause both virtual machines after the cloning operation is complete.

19. The system of claim 12, wherein the virtual machine manager and the first virtual machine are configured to communicate over a network.

20. The system of claim 12, wherein the first virtual machine is configured to communicate with the virtual machine manager using at least one of the following:
a) a virtual COM port using a pipe with a predefined name based on the unique identifier;
b) a virtual USB device; or
c) an API configured to allow communication between the virtual machine and the virtual machine manager.

21. The system of claim 12, wherein the virtual machine manager is a hypervisor.

22. The system of claim 12, wherein the processor of the first virtual machine is configured to:
generate one or more additional encryption keys prior to the virtual forking operation; and
wherein the processor of the first or second virtual machine is further configured to decrypt the data using at least one of the additional encryption keys.

23. A non-transitory computer readable medium comprising computer executable instructions for establishing a secure communication channel between at least two virtual machines, comprising instructions for:
generating, by a first virtual machine, an encryption key compatible with a symmetric encryption algorithm and storing the encryption key in a memory of the first virtual machine;
generating a second virtual machine by performing a virtual machine forking operation on the first virtual machine, wherein a memory of the generated second virtual machine contains the encryption key, and wherein the virtual machine forking operation comprises:
generating, by the first virtual machine, a unique identifier associated with the first virtual machine;
communicating, by the first virtual machine, a request to a virtual machine manager to generate the second virtual machine by cloning the first virtual machine; and
assigning, by the virtual machine manager, parent or clone status to the at least two virtual machines;
receiving, by one of the at least two virtual machines, a communication transmitted by another of the at least two virtual machines, wherein the communication comprises data encrypted using the encryption key; and
decrypting the data, by the recipient virtual machine, using the encryption key.

* * * * *